United States Patent
Waddington et al.

(10) Patent No.: US 6,684,203 B1
(45) Date of Patent: *Jan. 27, 2004

(54) USING GLOBAL TEMPORARY TABLES TO TRANSFORM QUERIES

(75) Inventors: William H. Waddington, Foster City, CA (US); Cetin Ozbutun, San Carlos, CA (US); Michael Charles Depledge, deceased, late of San Jose, CA (US), by Russell V. Roessler, Esq., executor and Daniel E. Hanley, Esq., executor; Angela Amor, Redwood City, CA (US)

(73) Assignee: Oracle International Corporation, Redwood Shores, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/436,053

(22) Filed: Nov. 8, 1999

(51) Int. Cl.[7] .............................................. G06F 17/30
(52) U.S. Cl. ........................................... 707/3; 709/102
(58) Field of Search .................... 707/1–10, 100–104.1; 709/100–104

(56) References Cited

U.S. PATENT DOCUMENTS

| | | | | |
|---|---|---|---|---|
| 5,301,317 A | * | 4/1994 | Lohman et al. ................ 707/2 |
| 5,495,606 A | * | 2/1996 | Borden et al. ................. 707/3 |
| 5,819,256 A | * | 10/1998 | Ozbutun et al. ............... 707/2 |
| 5,848,408 A | * | 12/1998 | Jakobsson et al. ............. 707/2 |
| 5,857,180 A | * | 1/1999 | Hallmark et al. .............. 707/2 |
| 5,864,842 A | * | 1/1999 | Pederson et al. .............. 707/3 |
| 5,909,681 A | * | 6/1999 | Passera et al. ............. 704/232 |
| 6,058,400 A | * | 5/2000 | Slaughter ...................... 707/1 |
| 6,081,801 A | * | 6/2000 | Cochrane et al. ........... 707/201 |
| 6,185,553 B1 | * | 2/2001 | Byrd et al. ................... 707/1 |
| 6,278,991 B1 | * | 8/2001 | Ebert ......................... 345/419 |
| 6,278,994 B1 | * | 8/2001 | Fuh et al. .................. 707/102 |

OTHER PUBLICATIONS

Jarke et al., "Query Optimization in Datbase Systems", ACM, vol. 16, Jun. 1984, pp. 111–152.*

* cited by examiner

Primary Examiner—John Breene
Assistant Examiner—Mohammad Ali
(74) Attorney, Agent, or Firm—Marcel K. Bingham; Hickman Palermo Truong & Becker LLP

(57) ABSTRACT

A technique and mechanism for transforming a query is described. A given query is transformed into a transformed query that references a global temporary table. Specifically, the given query contains a join between a given table and one or more other tables referenced by constraints (e.g. predicates). References to one or more of the constrained tables are replaced by a reference to a global temporary table. Before executing the transformed query, data that satisfies the constraints placed on the constrained table is inserted into the global temporary table.

32 Claims, 4 Drawing Sheets

FIG. 1

"SALES" (TABLE 106)

| SALE-ID | STORE-ID | PRODUCT-ID | DATE |
|---------|----------|------------|----------|
| 23456   | 1020     | 960        | 12/15/95 |
| ...     | ...      | ...        | ...      |
| 76934   | 1020     | 570        | 7/6/96   |

"STORES" (TABLE 102)

| STORE-ID | MANAGER | CITY     | STATE |
|----------|---------|----------|-------|
| 1020     | JOHNSON | SAN JOSE | CA    |
| ...      | ...     | ...      | ...   |
| 5034     | SMITH   | NY       | NY    |

"PRODUCTS" (TABLE 104)

| PRODUCT-ID | SOURCE | PARTS | COST  |
|------------|--------|-------|-------|
| 960        | HASBRO | 5     | $564  |
| ...        | ...    | ...   | ...   |
| 572        | NIKE   | 2     | $23   |

100

USING GLOBAL TEMPORARY TABLES TO TRANSFORM QUERIES

FIELD OF THE INVENTION

The present invention relates to optimizing execution of queries on a database system, and in particular, transforming queries so that they can be executed more efficiently.

BACKGROUND OF THE INVENTION

In relational database systems, a star schema is distinguished by the presence of one or more relatively large tables and several relatively smaller tables. Rather than duplicating the information contained in the smaller tables, the large tables contain references (foreign key values) to rows stored in the smaller tables. The larger tables within a star schema are referred to as "fact tables", while the smaller tables are referred to as "dimension tables". FIG. 1 illustrates an exemplary star schema with two dimensions.

Referring to FIG. 1, it illustrates a database system 100 that includes tables 102, 104 and 106. Table 102 is named "stores" and contains information about each of the stores in which sales may occur. Each row in store table 102 contains a unique store-id and information about the particular store that corresponds to the store-id. Table 104 is named "products" and contains information about each type of product that may be sold in any of the stores. Each row in product table 104 contains a unique product-id and information about the particular product.

Table 106 is named "sales" and contains information about each sale in each of the stores represented in the store table 102. Each row in sale table 106 includes a unique sale-id, a store-id to indicate the store at which the sale was made, a product-id to indicate the product sold in the sale, and the date of the sale. Typically, the number of sales will be vastly greater than both the number of stores at which the sales are made and the number of products carried by the stores. Detailed information about the store and product involved in a sale transaction does not have to be stored in the rows of table 106 because such detailed information is available in tables 102 and 104, respectively. Instead, the rows of table 106 simply contain values (store-ids and product-ids) that reference information stored in the other tables 102 and 104. Therefore, tables 102, 104 and 106 constitute a star schema in which table 106 is the fact table and tables 102 and 104 are dimension tables.

Queries that operate on data stored in tables that belong to a star schema are referred to as star queries. The format of a star query is described below.

STAR QUERY FORMAT

Star queries typically contain clauses which (1) identify the fact table and dimension tables, (2) specify the correspondence between the fact table columns and the dimension table columns, and (3) specify the constraints on the dimension table columns. For example, star queries in SQL typically have the form:

| QUERY 1 |
| --- |
| select . . . from fact, dim1, dim2, . . . , dimn<br>where fact.key1 = dim1.key<br>and fact.key2 = dim2.key |

| QUERY 1 |
| --- |
| -continued |
| and . . . and fact.keyn = dimn.key<br>and <dimension table constraints> |

In Query 1, the fact table is named "fact" and the dimension tables are named "dim1" through "dimn". The "where" clause includes expressions that equate columns in the fact table with corresponding columns in the dimension tables. Such expressions are referred to herein as "join predicates". For example, the expression "fact.key1=dim1.key" is a join predicate that specifies that the column "key1" in the fact table corresponds to the column "key" in the dimension table that is named "dim1".

Constraints are predicates referring to tables that restrict the query to a subset of the rows in the table referenced by the constraint. A table referenced by a constraint is referred to herein as a constrained table. The <dimension table constraints>are constraints referring to some or all of the dimension tables but not the fact table. For example, the query:

| QUERY 2 |
| --- |
| select sales.date from sales, stores, products<br>where sales.store-id = stores.store-id<br>and sales.product-id = products.product-id<br>and stores.city = 'San Jose'<br>and products.cost > $1,000 | includes the dimension table constraints "stores.city=San Jose" and "products.cost>$1,000".

STAR QUERY TRANSFORMATION

To execute a star query more efficiently, a star query may be rewritten. The process of rewriting queries is referred to herein as transformation. A method for transforming a star query is described in U.S. Pat. No. 5,848,408, issued to Hakan Jakobsson, et al., on Dec. 8, 1998.

Specifically, a star query (or the internal representation of a star query) is transformed by adding to the WHERE clause of the star query additional subqueries. These additional subqueries are constructed from the join predicates and dimension table constraints contained in the original star query. Specifically, for each constrained dimension k, an IN subquery may be generated of the form:

fact.keyk IN (select dimk.key from dimk where <dimk constraints>)

In the above expression, fact.keyk is the column of the fact table that a join predicate correlates with the "key" column of "dimk". For example, consider the query:

| QUERY 3 |
| --- |
| select * from fact, dim1, dim2, dim3<br>where fact.key1 = dim1.key<br>and fact.key2 = dim2.key<br>and fact.key3 = dim3.key<br>and dim1.c3 > 4 and (dim1.c6 = 10 or dim1.c6 = 11)<br>and dim3.c5 between 100 and 1000 |

Query 3 contains a dimension table constraint "dim1.c3 >4 and (dim1.c6 =10 or dim1.c6=11)" for dim1. The query contains a join predicate "fact.key1=dim1.key" which specifies a correlation between the "key" column of dim1 and the "key1" column of the fact table. Based on these expressions, the following subquery would be generated:

fact.key1 in (select dim1.key from dim1 where dim1.c3>4 and (dim1.c6=10 or dim1.c6 =11))

Query 3 also specifies a dimension table constraint "dim3.c5 between 100 and 1000" for dim3. The query contains a join predicate "fact.key3=dim3.key" which specifies a correlation between the "key" column of dim3 and the "key3" column of the fact table. Based on these expressions, the following subquery would be generated:

fact.key3 in (select dim3.key from dim3 where dim3.c5 between 100 and 1000)

The subqueries generated in this manner are ANDed to the other predicates that constrain the dimension table dimk. In the present example, the resulting "transformed" star query is:

| QUERY 5 |
| --- |
| select * from fact, dim1, dim2, dim3 |
| where fact.key1 = dim1.key |
| and fact.key2 = dim2.key |
| and fact.key3 = dim3.key |
| and dim1.c3 > 4 and (dim1.c6 = 10 or dim1.c6 = 11) |
| and dim3.c5 between 100 and 1000 |
| and fact.key1 in (select dim1.key from dim1 |
|     where dim1.c3 > 4 and (dim1.c6 = 10 or dim1.c6 = 11)) |
| and fact.key3 in (select dim3.key from dim3 |
|     where dim3.c5 between 100 and 1000) |

PARALLELIZING QUERY EXECUTION

Database systems may run on multi-processing systems. Multi-processing systems are typically partitioned into nodes, where each node may contain multiple processors executing multiple concurrent processes. To fully utilize the computing power of a multi-processing system, a database system may divide a large processing task required by a query into smaller work granules which may then be distributed to processes running on one or more processing nodes. Because the various work granules are being performed in parallel, the processing required by the query can be completed much faster than if the processing were performed on a single node by a single process.

To parallelize the execution of a star query, the work to be done on the fact table is dynamically partitioned by, for example, rowid range to create "work granules". The work granules are than assigned to a set of processes. These processes, referred to herein as parallel query slaves, execute their assigned work granules in parallel with the other parallel query slaves.

Each parallel query slave accesses the part of the fact table specified by the rowid range for the query slave and executes the IN subqueries. When executing an IN subquery, a parallel query slave process may scan the entire dimension table. Thus, while the query is executed once for each portion of the fact table, each IN subquery is executed repeatedly for the entire portion of a dimension table.

Based on the foregoing, it is clearly desirable to provide a method that reduces the duplicated and wasted effort expended by each slave process recomputing an IN subquery for the entire portion of a dimension table.

SUMMARY OF THE INVENTION

A technique and mechanism for transforming a query is described. According to an aspect of the present invention, a given query is transformed into a transformed query that references a global temporary table. Specifically, the given query contains a join between a given table and one or more other tables referenced by constraints (e.g. predicates). References to one or more of the constrained tables are replaced by a reference to a global temporary table. Before executing the transformed query, data that satisfies the constraints placed on the constrained table is inserted into the global temporary table.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a drawing of an exemplary star schema;

DETAILED DESCRIPTION OF THE PREFERRED EMBODIMENT

A method and apparatus for transforming queries is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

FUNCTIONAL OVERVIEW

According to an embodiment of the present invention, a star query is transformed into a transformed query that contains IN subqueries that reference the dimension table. One or more of the IN subqueries is then transformed into a IN subquery that references a Global Temporary Table. In addition, other references by the star query to the dimension table are replaced with references to the Global Temporary Table. Before executing the transformed star query, the Global Temporary Table is populated with data that would have been generated by executing the IN subquery that references the dimension table.

EXEMPLARY DATABASE SYSTEM

Figure 2:
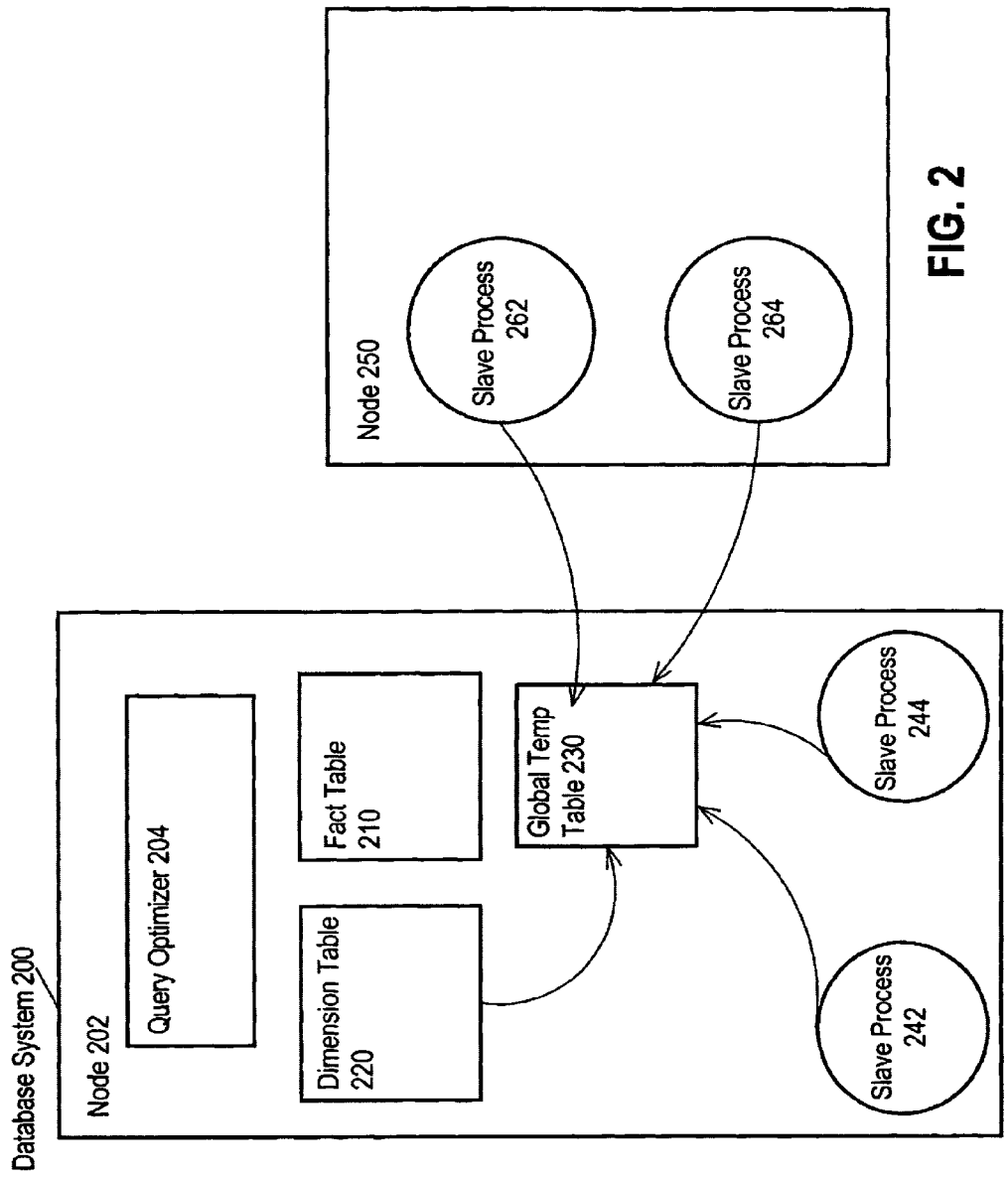
FIG. 2 is block diagram depicting a database system upon which an embodiment of the present may be implemented.

FIG. 2 is a block diagram of a database system 100 upon which an embodiment of the present invention may be implemented. The database system 100 includes two interconnected nodes 202 and node 250.

Database system 200 receives and executes queries. Before executing the queries, the queries are optimized by query optimizer 204. Query optimizer 204 optimizes queries by, for example, generating various execution plans for executing a query, determining an execution cost for each execution plan, and selecting the execution plan with the least cost. Some of the execution plans may involve transforming the query. For example, assume that database system 200 receives the star query EX1. Query EX1 references fact table 210 and dimension table 220. Query optimizer 204 develops various plans for execution, some involve executing star query EX1 without transforming it, others involve alternate star query transformations of star query EX1. For each execution plan a cost is determined, the least costly plan is selected, and the selected execution plan is executed by database system 200.

To execute a query in parallel, the work of executing the query may be divided into work granules and assigned to slave processes on nodes 202 and 250, such as slave processes 242, 244 on node 202, and slave processes 262 and 264 on node 250. Slave processes 242, 244, 262, and 264 execute the work granules as part of one or more transactions, and are each associated with a session. A transaction is logical unit of work that is atomic. A session is the establishment of a particular connection between a client and a database system. When a slave process executes a query requested by a user, the slave process is associated with a session of the user while the slave process is participating in the execution of a query.

GLOBAL TEMPORARY TABLES

Figure 3:
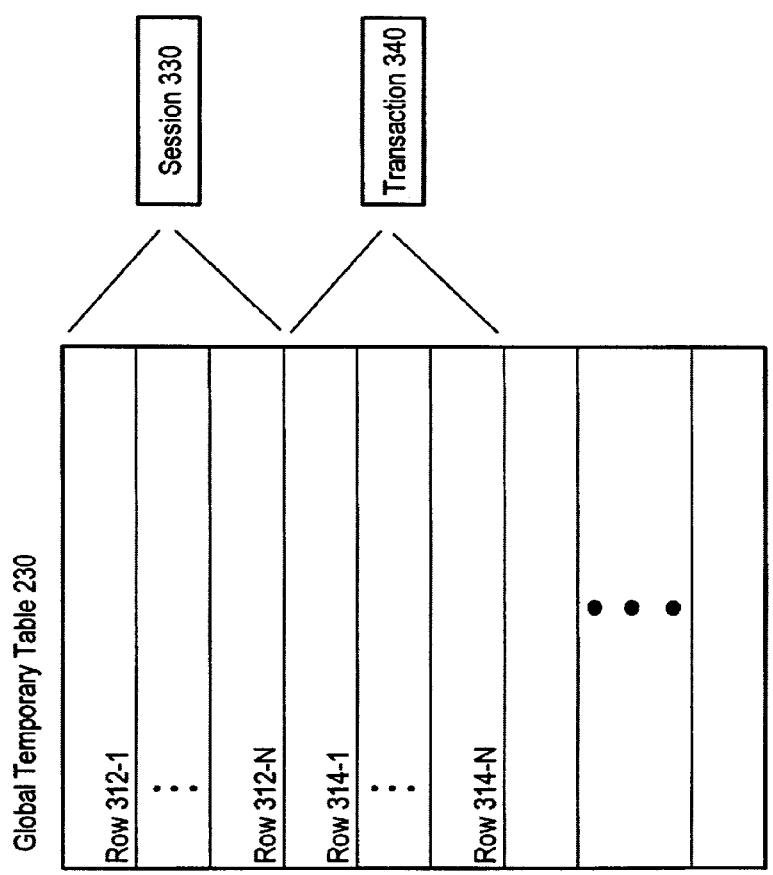
FIG. 3 is block diagram depicting a global temporary table.

As mentioned earlier, a star query may be transformed into a transformed query that references a Global Temporary Table such as global temporary table 230 in FIG. 2. FIG. 3 shows a Global Temporary Table 230 in greater detail. A global temporary table, such Global Temporary Table 230, is a table that includes one or more rows with one or more attributes (e.g. columns), where each row is associated with a duration entity. A duration entity is an entity whose duration is used to dictate the duration of the existence of a row in a global table. Examples of duration entities are transactions, sessions, or processes. A row is associated with the one or more duration entities associated with the process that inserted the data. When a duration entity expires, the row in a Global Temporary Table is deleted, or is at least treated by database system 200 as if the row were deleted. Like other types of tables managed by a database system, a Global Temporary Table is globally available, that is, it may be used and seen by multiple users and processes.

Referring to FIG. 3, Session 330 is a duration entity for rows 312-1 through 312-N. When Session 330 expires, rows 312-1 through 312-N no longer logically exist, and may be deleted in response to Session 330 expiring, or deleted lazily at a later time. Transaction 340 is a duration entity for Rows 314-1 through 314-N. When Transaction 340 terminates (e.g. is committed or aborted), rows 314-1 through 314-N no longer exist, and may be deleted in response to Transaction 340 expiring, or may be deleted lazily by another process.

STAR QUERY TRANSFORMATION USING GLOBAL TEMPORARY TABLES

The following query T1 is provided as an illustration of a how a star query may be transformed to use a global temporary table. The query T1 includes three dimension tables, "d1", "d2", and "d3", and the fact table, "fact".

| QUERY T1 |
| --- |
| SELECT * FROM fact, d1, d2, d3<br>    WHERE fact.c1 = d1.c1 AND fact.c2 = d2.c1 AND fact.c3 = d3.c1 |

| QUERY T1 |
| --- |
|     AND d1.c2 IN (1, 2, 3, 4)<br>    AND d2.c2 < 100<br>    AND d3.c2 = 35 |

Query T1 is transformed into a transformed query T2 that contains three additional IN subqueries as follows.

| QUERY T2 |
| --- |
| SELECT * FROM fact, d1, d2, d3<br>    WHERE fact.c1 = d1.c1 AND fact.c2 = d2.c1 AND fact.c3 = d3.c3<br>    AND d1.c2 IN (1, 2, 3, 4)<br>    AND d2.c2 < 100<br>    AND d3.c2 = 35<br>    AND fact.c1 IN (SELECT dl.c1 FROM d1 WHERE d1.c2 IN (1, 2, 3, 4))<br>    AND fact.c2 IN (select d2.c1 FROM d2 WHERE d2.c2 < 100)<br>    AND fact.c3 IN (SELECT d3.c1 FROM d3 WHERE d3.c2 = 35) |

If an IN subquery satisfies cost criteria, then a global temporary table is created and used to transform and execute the query. Specifically, a global temporary table is created by, for example, the query optimizer 204 issuing data definition language commands to database system 200 to create the global temporary table. The query is transformed by replacing references to a dimension table (the "selected dimension table") referenced by an IN subquery (the "selected IN subquery") with references to the global temporary table. For purposes of illustration, it shall be assumed that the first IN subquery of query T2 satisfies cost criteria. The first IN subquery of query T2 is shown below.

SELECT d1.c1 from d1 where d1.c2 in (1, 2, 3, 4)

In Query T2, references to dl are replaced with references to Global temporary table ORA_TEMP_1_123, resulting in the following transformed query T3.

| QUERY T3 |
| --- |
| SELECT * FROM fact, ORA_TEMP_1_123, d2, d3<br>    WHERE fact.c1 = ORA_TEMP_1_123.c1 AND<br>    fact.c2 = d2.c1 and fact.c3 = d3.c1<br>    AND ORA_TEMP_1_123.c1 IN (1, 2, 3, 4)<br>    AND d2.c2 < 100<br>    AND d3.c2 = 35<br>    AND fact.c1 IN (SELECT ORA_TEMP_1_123.c1<br>    FROM ORA_TEMP_1_123)<br>    AND fact.c2 IN (SELECT d2.c1 FROM d2 WHERE d2.c2 < 100)<br>    AND fact.c3 IN (SELECT d3.c1 FROM d3 WHERE d3.c2 = 35) |

Before the query is executed, the global temporary table ORA_TEMP_1_123 is populated with the results of the selected IN subquery. The Query optimizer 204, for example, may cause the IN subquery to be executed and the results thereof inserted into the global temporary table prior to the execution of query T3.

Various cost criteria can be applied when determining whether to replace references to a dimension table referenced by an IN subquery with references to a global temporary table. For example, a dimension table must be sufficiently large, or the constraints on the dimension table must be sufficiently selective so that only a small portion of the dimensional table needs to be retrieved during execution of the IN subquery.

In general, it will be advantageous to transform a star query into a transformed query that references a global temporary table when the cost in creating and populating the global temporary table is less than the overhead incurred in executing an IN subquery multiple times on the dimension table. Under these circumstances, a transformed query that references a global temporary table may reduce the overhead caused by multiple slave processes each executing the same IN subquery on a dimension table.

In addition to star queries, other types of queries may be advantageously transformed to use global temporary tables. For example, it may be advantageous to transform a query to reference a global temporary table whenever execution of the query entails multiple slave processes generating the same results by selectively scanning the same table. Thus, the present invention is not limited to transformations involving star queries.

VIEW SPECIFICITY

In some database systems, data inserted into a global temporary table is "view specific". "View specific" data may only be seen by a given process associated with a duration entity that is associated with the data. For example, a slave process creates data in a global temporary table while executing a transaction A. Only that slave process and other parallel slaves executing the transaction A may see the data. Processes that are not executing transaction A may not see the data. View specific data associated with the duration entity of a process is referred to herein as being "specific" to the process.

For database systems where the data inserted into a global temporary table is view specific, a mechanism is needed to permit query slave processes to see view specific data not specific to them. For example, before executing a star query that is transformed to reference a global temporary table, query optimizer 204 inserts view specific data from a dimension table into the global temporary table. The view specific data is associated with the session of the entity causing the insertion, which in this case is query optimizer 204 (session "Z"), not the session of the user that issued the star query. The slave processes participating in executing the star query are each associated with the session in which the star query was issued. Thus, the slave processes may not see the view specific data unless a mechanism is made available that allows them to see the view specific data.

For example, in a database system, slave processes access global temporary tables by invoking a routine (e.g. function, object method). According to one embodiment the routine by which slave processes access global temporary tables is modified to allow a query slave process to access view data not specific to the slave process. When invoking the routine, the slave process passes in, as a parameter, data identifying (1) the session that inserted data that the slave process must access and (2) the global temporary table in which that data resides. According to one embodiment, the session id of the entity that inserted the data is passed to the slave process when a work granule that requires access to the data is assigned to the slave process. The routine provides to the slave process access to the global temporary table as if the slave process were associated with the session of the entity that inserted the data into the global temporary table, allowing the slave process to see the view specific data.

HARDWARE OVERVIEW

Figure 4:
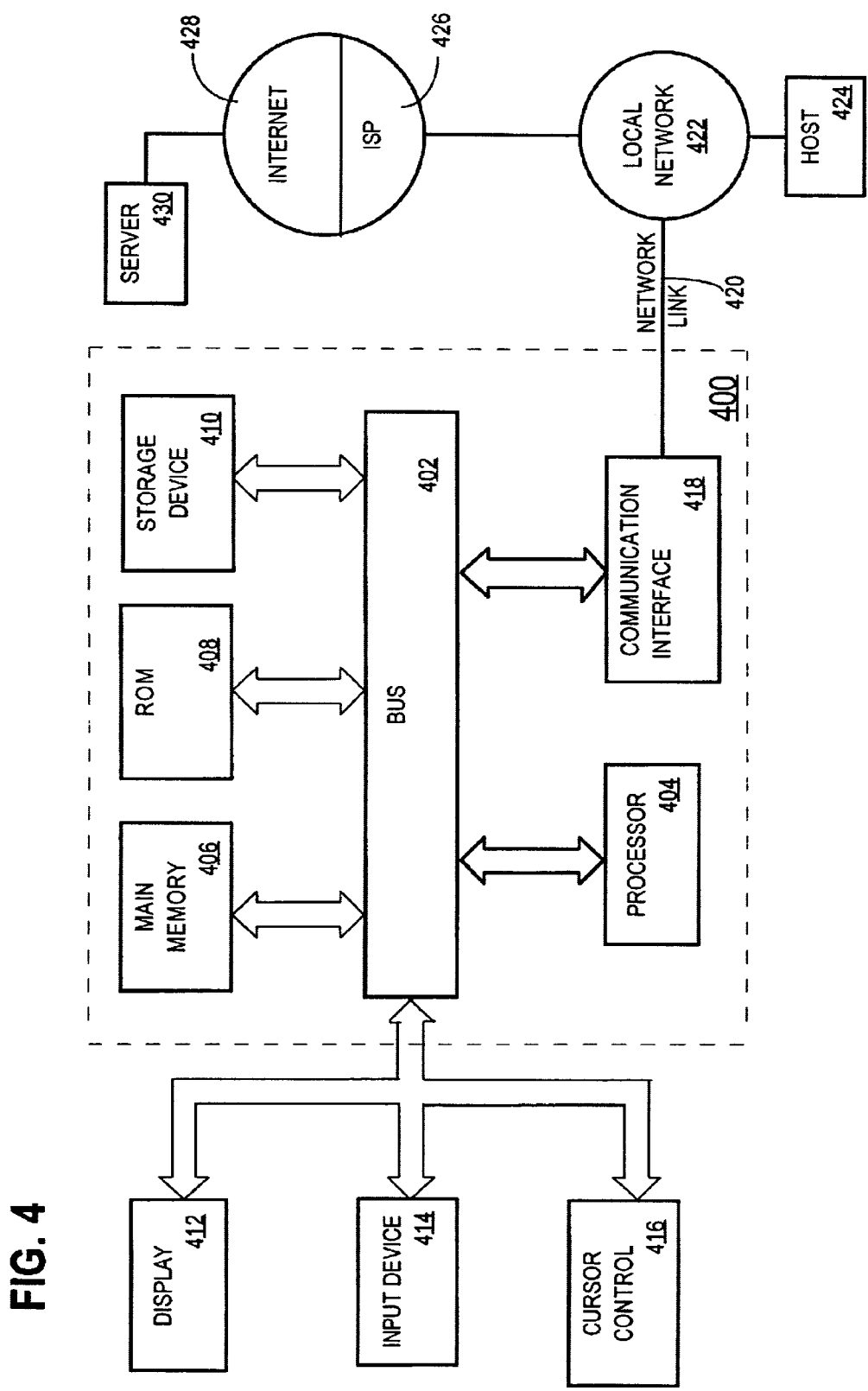
FIG. 4 is a block diagram depicting a computer system upon which an embodiment of the present invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are implemented by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application implements the techniques described herein.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for processing a given query that requires retrieval of data from a particular table and a join between the particular table and one or more constrained tables and that specifies one or more constraints on said one or more constrained tables, the method comprising the steps of;

populating the particular table that is not referenced by said given query with data from a constrained table of said one or more constrained tables, wherein said data from said constrained table satisfies at least one constraint of said one or more constraints that constrain said constrained table;

transforming the given query to produce a transformed query that references said particular table;

causing every process responsible for execution of the given query to access data required from the constrained table by accessing said data from said particular table; and a plurality of slave processes each executing a portion of operations needed to execute said given query, wherein each of said plurality of slave processes accesses said particular table.

2. The method of claim 1 wherein said data is associated with a first duration entity, wherein at least one slave process of said plurality of slave processes is associated with a second duration entity but not said first duration entity.

3. The method of claim 2, wherein said first duration entity is a first session, and wherein said at least one slave process is associated with a second duration entity that is a second session.

4. The method of claim 1, wherein said particular table referenced by said given query is a fact table.

5. The method of claim 1, wherein the step of populating the particular table includes populating the particular table with data from a dimension table.

6. The method of claim 1, further including the steps of:

determining whether said given query meets one or more conditions for transforming the given query into a transformed query that references said particular table; and wherein the step of transforming is performed when said given query meets said one or more conditions.

7. The method of claim 6, wherein the one or more conditions includes that said at least one constraint satisfy selectivity criteria.

8. The method of claim 1, wherein said particular table is a fact table and each of said one or more constrained tables is a dimension table, wherein the step of transforming the given query includes transforming the given query to produce a transformed query that references said particular table.

9. The method of claim 8, wherein the step of transforming the given query to produce a transformed query that references said particular table includes:

transforming the given query to produce a transformed query that includes at least one IN subquery in the form:

fact.keyk IN (select dimk.key from dimk where <dimk constraints>); and selecting said at least one IN subquery for transforming;

transforming said at least one IN subquery to produce a subquery that references said particular table.

10. The method of claim 9, wherein the step of selecting said at least one IN subquery includes transforming said at least one IN subquery when said at least one IN subquery satisfies one or more conditions for transforming said at least one IN subquery.

11. The method of claim 9, wherein said at least one IN subquery includes said at least one constraint, wherein said one or more conditions for transforming said at least one IN subquery include said at least one constraint satisfying selectivity criteria.

12. A method of creating a data repository in a database system, the method comprising the steps of:
receiving a request to generate a global temporary table that holds data:
whose duration is defined by at least one duration entity, and
that is globally accessible to processes that are associated with a plurality duration entities;
inserting one or more records into said global temporary table, wherein said one or more records have durations that are defined by one or more duration entities;
receiving a request for said data by a first process associated with a particular duration entity not included in said one or more duration entities;
receiving another request for said data by a second process that is associated with another duration entity that is not associated with said first process; and
supplying said data to both said first process and said second process.

13. The method of claim 12, wherein:
the step of inserting one or more records includes inserting in said global temporary table one or more records whose duration is defined by a first session; and
the step of receiving a request includes receiving a request for said data whose duration is defined by said first session, wherein said first process is associated with a second session that is:
different from said first session, and
not included in said one or more duration entities.

14. The method of claim 12, wherein:
the step of inserting one or more records includes inserting in said global temporary table one or more records whose duration is defined by a first transaction; and
the step of receiving a request includes receiving a request for data whose duration is defined by said first transaction, wherein said first process is associated with a duration entity that is a second transaction that is:
different from said first transaction, and
not included in said one or more duration entities.

15. The method of claim 12, wherein:
the step of inserting one or more records includes another process inserting one or more records in said global temporary table, wherein said other process is associated with another duration entity, wherein said one or more duration entities include said other duration entity;
the method further includes transmitting to said first process data specifying said other duration entity; and
the step of receiving a request for said data by a first process includes receiving a request by said first process for one or more records whose duration is defined by said other duration entity, wherein said request includes said data specifying said other duration entity.

16. The method of claim 15, further including the step of said first process causing generation of said request by:
invoking a routine for accessing data in said global temporary table; and
passing as one or more parameter values to said routine said data specifying said other duration entity.

17. A computer-readable medium carrying one or more sequences of one or more instructions for processing a given query that requires retrieval of data from a particular table and a join between the particular table and one or more constrained tables and that specifies one or more constraints on said one or more constrained tables, the one or more sequences of one or more instructions including instructions which, when executed by one or more processors, cause the one or more processors to perform the steps of:
populating the particular table that is not referenced by said given query with data from a constrained table of said one or more constrained tables, wherein said data from said constrained table satisfies at least one constraint of said one or more constraints that constrain said constrained table;
transforming the given query to produce a transformed query that references said particular table;
causing every process responsible for execution of the given query to access data required from the constrained table by accessing said data from said particular table; and
a plurality of slave processes each executing a portion of operations needed to execute said given query, wherein each of said plurality of slave processes accesses said particular table.

18. A computer-readable medium carrying one or more sequences of one or more instructions for creating a data repository in a database system, the one or more sequences of one or more instructions including instructions which, when executed by one or more processors, cause the one or more processors to perform the steps of:
receiving a request to generate a global temporary table that holds data:
whose duration is defined by at least one duration entity, and
that is globally accessible to processes that are associated with a plurality duration entities;
inserting one or more records into said global temporary table, wherein said one or more records have durations that are defined by one or more duration entities;
receiving a request for said data by a first process associated with a particular duration entity not included in said one or more duration entities;
receiving another request for said data by a second process that is associated with another duration entity that is not associated with said first process; and
supplying said data to both said first process and said second process.

19. The computer-readable medium of claim 17, wherein said data is associated with a first duration entity, wherein at least one slave process of said plurality of slave processes is associated with a second duration entity but not said first duration.

20. The computer-readable medium of claim 19, wherein said first duration entity is a first session, and wherein said at least one slave process is associated with a second duration entity that is a second session.

21. The computer-readable medium of claim 17, wherein said particular table referenced by said given query is a fact table.

22. The computer-readable medium of claim 17, wherein the step of populating the particular table with data from a dimension table.

23. The computer-readable medium of claim 17, the steps further including:
determining whether said given query meets one or more conditions for transforming the given query into a transformed query that references said particular table; and wherein the step of transforming is performed when said given query meets said one or more conditions.

24. The computer-readable medium of claim 23, wherein the one or more conditions includes that said at least one constraint satisfy selectivity criteria.

25. The computer-readable medium of claim 17, wherein said particular table is a fact table and each of said one or more constrained tables is a dimension table, wherein the step of transforming the given query includes transforming the given query to produce a transformed query that references said particular table.

26. The computer-readable medium of claim 25, wherein the step of transforming the given query to produce a transformed query that references said particular table includes:

transforming the given query to produce a transformed query that includes at least one IN subquery in the form:

fact.keyk IN (select dimk.key from dimk where <dink constraints>); and selecting said at least one IN subquery for transforming;

transforming said at least one IN subquery to produce a subquery that references said particular table.

27. The computer-readable medium of claim 26, wherein the step of selecting said at least one IN subquery includes transforming said at least one IN subquery when said at least one IN subquery satisfies one or more conditions for transforming said at least one IN subquery.

28. The computer-readable medium of claim 26, wherein said at least one IN subquery includes said at least one constraint, wherein said one or more conditions for transforming said at least one IN subquery include said at least one constraint satisfying selectivity criteria.

29. The computer-readable medium of claim 12, wherein:

the step of inserting one or more records includes inserting in said global temporary table one or more records whose duration is defined by a first session; and the step of receiving a request includes receiving a request for said data whose duration is defined by said first session, wherein said first process is associated with a second session that is:

different from said first session, and not included in said one or more duration entities.

30. The computer-readable medium of claim 18, wherein:

the step of inserting one or more records includes inserting in said global temporary table one or more records whose duration is defined by a first transaction; and the step of receiving a request includes receiving a request for data whose duration is defined by said first transaction, wherein said first process is associated with a duration entity that is a second transaction that is:

different from said first transaction, and not included in said one or more duration entities.

31. The computer-readable medium of claim 18, wherein:

the step of inserting one or more records includes another process inserting one or more records in said global temporary table, wherein said other process is associated with another duration entity, wherein said one or more duration entities include said other duration entity;

the computer-readable medium further includes transmitting to said first process data specifying said other duration entity; and the step of receiving a request for said data by a first process includes receiving a request by said first process for one or more records whose duration is defined by said other duration entity, wherein said request includes said data specifying said other duration entity.

32. The computer-readable medium of claim 31, further including the step of said first process causing generation of said request by:

invoking a routine for accessing data in said global temporary table; and passing as one or more parameter values to said routine said data specifying said other duration entity.

* * * * *